United States Patent
Merenda

(10) Patent No.: US 6,614,403 B1
(45) Date of Patent: Sep. 2, 2003

(54) RADIATION SYNTHESIZER RECEIVE AND TRANSMIT SYSTEMS

(75) Inventor: Joseph T. Merenda, Northport, NY (US)

(73) Assignee: Bae Systems Information and Electronic Systems Integration, Inc., Greenlawn, NY (US)

( * ) Notice: Subject to any disclaimer, the term of this patent is extended or adjusted under 35 U.S.C. 154(b) by 0 days.

(21) Appl. No.: 10/114,102

(22) Filed: Apr. 1, 2002

(51) Int. Cl.$^7$ ............................................... H01Q 11/12
(52) U.S. Cl. ..................... 343/741; 343/701; 343/742; 343/876; 331/16; 333/103
(58) Field of Search ................................ 343/701, 741, 343/742, 866, 867, 876; 331/16, 17, 25; 333/103, 104; H01Q 11/12

(56) References Cited

U.S. PATENT DOCUMENTS

| | | | |
|---|---|---|---|
| 5,281,941 A | * | 1/1994 | Bernstein ..................... 336/188 |
| 5,402,133 A | | 3/1995 | Merenda ..................... 343/701 |
| 5,497,126 A | * | 3/1996 | Kosiec et al. ................ 331/1 A |
| 5,703,539 A | * | 12/1997 | Gillig et al. ................... 331/16 |
| 5,784,032 A | * | 7/1998 | Johnston et al. ............ 343/702 |
| 6,150,986 A | * | 11/2000 | Sandberg et al. ........... 343/742 |
| 6,160,525 A | * | 12/2000 | Lopez ......................... 343/866 |
| 6,188,288 B1 | * | 2/2001 | Ragan et al. ................. 331/16 |
| 6,229,494 B1 | | 5/2001 | Merenda ..................... 343/741 |

* cited by examiner

*Primary Examiner*—Tho Phan
(74) *Attorney, Agent, or Firm*—Kenneth P. Robinson

(57) ABSTRACT

Radiation synthesizer systems provide efficient wideband operation with an antenna, such as a loop, which is small relative to operating wavelength. Energy dissipation is substantially reduced by cycling energy back and forth between a high-Q radiator and a storage capacitance under control of a switching circuit. In addition to transmit operation using an energy source such as a battery, by reciprocity receive systems deliver received signals to an output device, such as a speaker or other audio or visual transducer device. By efficient direct processing, via controlled activation of switch devices of switch modules, incident RF signals are converted to baseband signals. Commercial type AM receivers may be provided without IF processing and detection or analog filters.

22 Claims, 4 Drawing Sheets

PROR ART

RADIATION SYNTHESIZER RECEIVE AND TRANSMIT SYSTEMS

RELATED APPLICATIONS (Not Applicable)

FEDERALLY SPONSORED RESEARCH (Not Applicable)

BACKGROUND OF THE INVENTION

The present invention relates to radio type systems and, more particularly, to improved radiation synthesizer systems enabling efficient use of small high-Q antennas by active control of energy transfer back and forth between an antenna reactance and a storage reactance.

The theory and implementation of Synthesizer Radiating Systems and Methods are described in U.S. Pat. No. 5,402,133 of that title as issued to the present inventor on Mar. 28, 1995. Further aspects are described in U.S. Pat. 6,229,494, titled Radiation Synthesizer Systems and Methods, as issued to the present inventor on May 8, 2001. These patents ("the '133 patent" and "the '494 patent") are hereby incorporated by reference.

A basic radiation synthesizer circuit, as described in the '133 patent, which combines transfer circuits in both directions using two switches is shown in FIG. 1a. This circuit functions as an active loop antenna where the loop antenna L is the high Q inductive load and a capacitor C is used as the storage reactor. The FIG. 1a circuit uses two RF type switching transistors, shown as switches RC and DC, for rate and direction control, respectively. Because the devices are operated in a switch mode, efficient operation is obtained since, in theory, no instantaneous power is ever dissipated by such devices. A slower switching device, shown as power control switch PC, can be used to add energy to the circuit from the power supply as energy is radiated. The voltage and current sensor terminals VS and CS, respectively, are used to monitor and calculate the total amount of stored energy at any instant in time, while a feedback control circuit is used to maintain the total energy at a preset value through use of the power control switch PC.

In the FIG. 1a circuit, when the direction control switch is open, energy can be transferred from current through the inductor L to voltage across the capacitor C, as illustrated by the L to C energy transfer diagram of FIG. 1b. With the rate control switch closed, current flows from ground, through diode D1 and L, and back to ground through the rate control switch RC. In the absence of circuit losses, the current would continue to flow indefinitely. When the rate control switch RC is opened, the inductor current, which must remain continuous, flows through diode D2 and charges up the capacitor C. The rate at which C charges up is determined by the switch open duty cycle of the switch RC. The capacitor will charge up at the maximum rate when the switch is continuously open. The charging time constant is directly proportional to the switch open duty cycle of the rate control switch RC.

When the direction control switch DC of FIG. 1a is closed, energy can be transferred from voltage across the capacitor to current through the inductor, as shown in the C to L energy transfer diagram of FIG. 1c. Diode D1 is always back biased and is, therefore, out of the circuit. When the rate control switch RC is closed, the capacitor C will discharge through L, gradually building up the current through L. If the rate control switch is opened, the capacitor will maintain its voltage while the inductor current flows in a loop through diode D2. In this C to L direction transfer mode, the rate is controlled by the switch closure duty cycle of switch RC. The maximum rate of energy transfer occurs when the switch RC is continuously closed. Its operation is the inverse of that in the other direction transfer mode (L to C).

It should be noted that, in either direction, charge or discharge is exponential. Therefore, the rate of voltage or current rise is not constant for a given rate control duty cycle. In order to maintain a constant rate of charging (ramp in voltage or current), it is necessary to appropriately modulate the duty cycle as charging progresses. Duty cycle determinations and other aspects of operation and control of radiation synthesizer systems are discussed at length in the '133 patent (in which FIGS. 1a, 1b and 1c referred to above appear as FIGS. 8a, 8b and 8c).

In theory, since the power which is not radiated is transferred back and forth rather than being dissipated, lossless operation is possible. However, as recognized in the '133 patent losses are relevant in high frequency switching operations, particularly as a result of the practical presence of ON resistance of switch devices and inherent capacitance associated with switch control terminals. While such device properties are associated with very small losses of stored energy each time a switch is closed, aggregate losses can become significant as high switching frequencies are employed. In addition, if small loop antennas are to be employed, for example, antenna impedance may be higher than basic switching circuit impedance levels, necessitating use of impedance matching circuits which may have less than optimum operating characteristics.

The basic radiation synthesizer circuit discussed above can be reduced to the simplified ideal model shown in FIG. 2. This model replaces the diodes in the basic circuit by ideal switches, and provides push-pull operation (current can flow in either direction through the loop antenna). The push-pull, or bipolar circuit, is more efficient than the single-ended circuit by a factor of 2 (3 dB). The FIG. 2 system includes four power switch devices comprising a switching circuit pursuant to the invention. The FIG. 2 system includes loop antenna 12, storage capacitor 14 and power switch devices 21, 22, 23 and 24, which will also be referred to as switch devices S1, S2, S3 and S4, respectively. Three possible states exist: linear charging of inductor current, linear discharging, and constant current. It is possible to synthesize any waveform using this circuit, with waveform fidelity dependent on sampling speed.

A more complete block diagram of a radiation synthesizer system is shown in FIG. 3. Since each pair of switch devices (i.e., S1/S2 and S3/S4) is always switched in a coordinated manner, and each pair is antiphase, a common control circuit C is used for each pair. Each control circuit C implements sequential switching by delaying the appropriate short circuit transition until after an open circuit transition has been made. This process occurs for each change of state in input driver logic signals provided at the input to control circuit C. Operational and other aspects of the circuits of FIGS. 2 and 3 are described in greater detail in the '494 patent (in which FIGS. 2 and 3 referred to above appear as FIGS. 2 and 12, respectively).

In addition to applications for signal transmit purposes, it is desirable to apply radiation synthesizer systems to receive applications.

Objects of the invention are, therefore, to provide new and improved radiation synthesizer systems, particularly such as enable one or more of the following advantages and capabilities:

efficient signal reception;

broadband operation;

signal reception using electrically small antennas;

efficient low frequency, small antenna systems;

systems providing signal receive and transmit;

simplified direct synthesis receivers (e.g., no IF processing or detection); and receivers enabling monolithic circuit construction (e.g., while minimizing number of receiver components).

SUMMARY OF THE INVENTION

In accordance with the invention, a radiation synthesizer system, to receive incident signals, includes an antenna element having a first reactive characteristic and a storage element having a second reactive characteristic. At least one switch module is coupled between the antenna element and the storage element and includes switch devices arranged for controlled activation to transfer energy back and forth between the storage element and the antenna element. An output device is coupled to the storage element to enable use of output signals derived, via activation of the switch devices, from signals incident at the antenna element. A control device is coupled to each switch module to control activation of the switch devices in response to indicia of synchronization between activation of the switch devices and the signals incident at the antenna element.

In order to transmit signals as well as receive signals, the control device of the radiation synthesizer system may include a selectable transmit mode in which the control device is responsive to an input signal representative of a signal to be transmitted and is not responsive to the above-referenced indicia of synchronization. For this purpose, the system may further include an input device coupled to the control device to enable coupling of an input signal representative of a signal to be transmitted.

In other embodiments, a radiation synthesizer system may utilize a loop antenna element comprising a plurality of loop segments, with individual switch modules each coupled between a different pair of loop segments. Crossed-loop configurations may be used for isotropic coverage applications and control signal feeds via optical cables and DC feeds via conductors of the loop antenna elements may be employed to provide operational and other advantages in particular applications.

In a further embodiment, a radiation synthesizer, to receive and transmit signals, includes an antenna element having a first reactive characteristic and a storage element having a second reactive characteristic. A switch module is coupled between the antenna element and the storage element and includes switch devices arranged for controlled activation to transfer energy back and forth between the storage element and the antenna element during transmission. A control device is coupled to the switch module to control activation of the switch devices in response to an input signal representative of a signal to be transmitted. An output device is selectively coupled to the antenna element to enable use of output signals received via the antenna element during receive periods in which the switch devices are not subject to controlled activation for energy transfer. Reception is thus enabled by use of the antenna element independently of activation of the switch devices.

For a better understanding of the invention, together with other and further objects, reference is made to the accompanying drawings and the scope of the invention will be pointed out in the accompanying claims.

DESCRIPTION OF THE INVENTION

Figure 4:
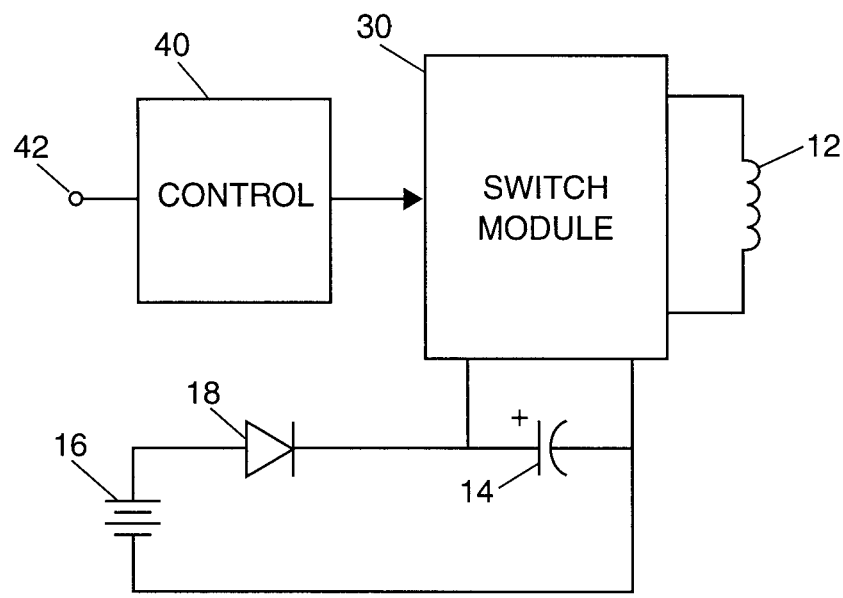
FIG. 4 is a block diagram of a radiation synthesizer system useful in describing the invention.

A radiation synthesizer, as shown in simplified form in FIG. 4, provides improved radiation efficiency enabling practical operation in applications in which both wide bandwidth and use of an electrically-small antenna are desired, for example. The term electrically-small is used to describe antennas whose largest physical dimension is typically less than about 0.1 wavelength at operating frequencies. Operational objectives may require the use of electrically-small antennas where operation at frequencies in the VHF range or lower is desired without constraints associated with employment of larger antennas.

Figure 1A:
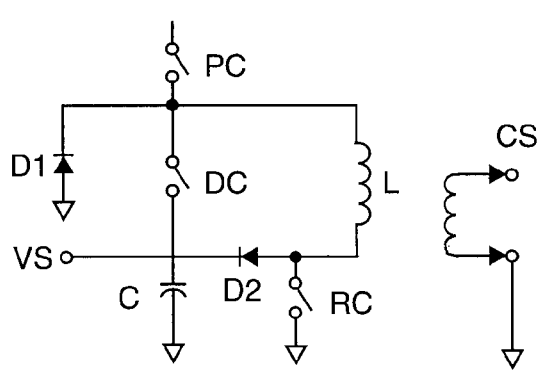
FIGS. 1a, 1b and 1c are simplified circuit diagrams useful in describing operation of basic operating concepts.
Figure 1B:
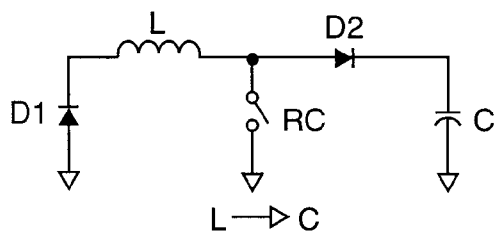
Figure 1C:
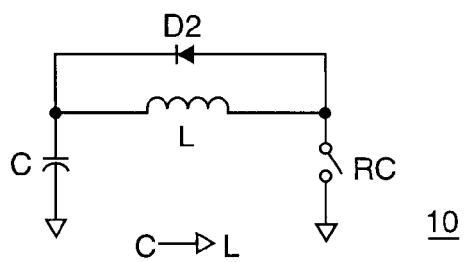
Figure 2:
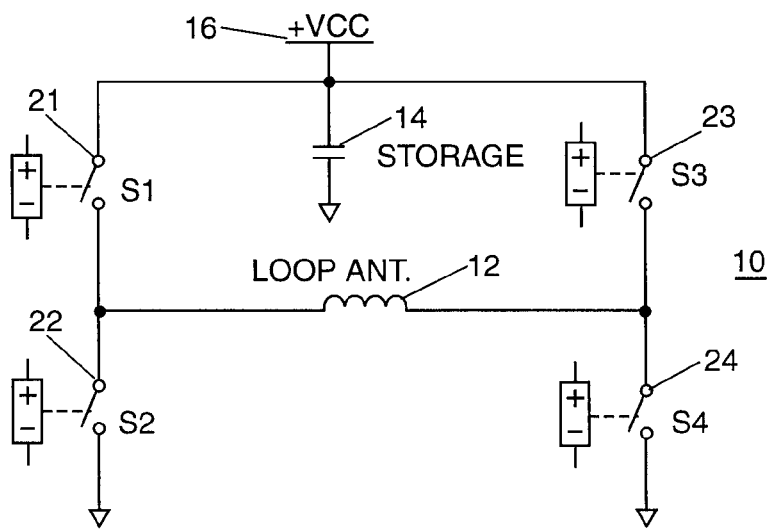
FIG. 2 shows a previously described basic radiation synthesizer circuit.

With theoretical efficiency of operation of one hundred percent, operation of radiation synthesizers with electrically-small antennas have provided calculated and measured performance improvements of from 10 to 100 times that of traditional approaches. As described in the '133 and '494 patents, a unique switching circuit (e.g., as shown in FIG. 2) is placed between an antenna element (e.g., loop element 12) and a storage element (e.g., storage capacitance 14). In FIG. 4, switch module 30 includes such a switching circuit (e.g., the FIG. 2 type circuit including individual switch devices S1, S2, S3, S4, exclusive of antenna 12 and capacitor 14) and may also include related elements.

Switch module 30, in response to control signals controlling activation of its switch devices (e.g., switch devices S1–S4 as described) transfers energy back and forth between the loop antenna element 12 and the storage capacitance 14. In FIG. 4, the control signals are provided via control device 40, which is responsive to an input at input device 42 (e.g., an input terminal). The control signals are determined by the desired radiation waveform to be transmitted and the switch module 30 may be designed to operate in response to control signals having an input waveform comprising a low-level analog replica or a digital representation of a transmit signal, for example. In the resulting operation of the FIG. 4 system, the energy consumed in signal transmission is provided by a net energy flow from battery 16, shown as the prime power source for the system. Diode 18 is included in this example to restrict reverse current flow. This is consistent with the more detailed description of transmit operation as provided in the '133 and '494 patents.

In transmit operation, there is thus a flow of energy from battery 16, via activation of the switch devices of the switch module 30, to RF signals radiated via the loop antenna element 12. As is typical for many types of antenna systems, reciprocity applies and signal reception can be implemented via an electrically-small antenna pursuant to the invention.

Figure 5:
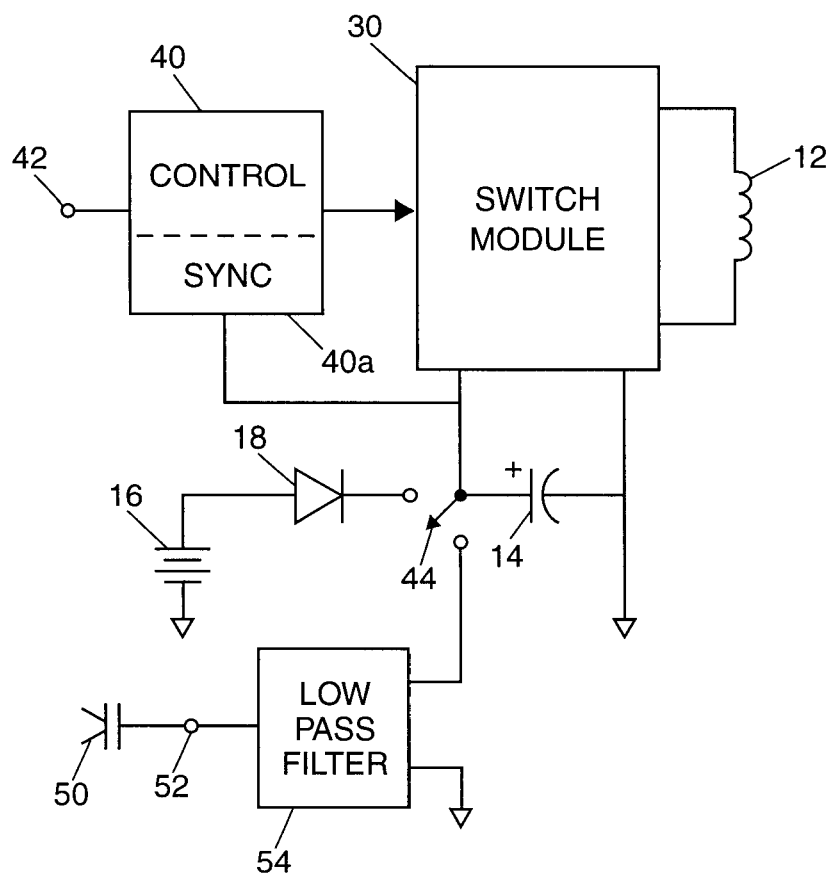
FIG. 5 is a block diagram of a radiation synthesizer system arranged to receive and transmit signals, pursuant to the invention.

A radiation synthesizer system arranged to receive (as well as transmit) signals is shown in simplified form in FIG. 5. A switching device, shown as switch 44, enables selection between the receive and transmit modes of operation. In the transmit case, activation of the switch devices of switch module 30, in response to a desired transmit signal or waveform, generates a waveform across the antenna element 12 which incorporates the desired signal. As in the FIG. 4 system, energy is supplied by battery 16. In the receive case, with appropriate activation of the switch devices of switch module 30, a received signal as incident on antenna element 12 will be processed through the switch module 30 from the antenna element.

For signal reception, in FIG. 5 battery 16 is disconnected by action of switch 44 and replaced by a signal usage element, shown as speaker 50, connected via output device 52 (e.g., an output terminal). Whereas for transmit energy from the battery is delivered to the antenna element, with reciprocity during reception available receive energy incident at the antenna is, by synthesizer processing, delivered to an output device, such as a speaker or other signal usage or transducer unit, to provide a perceptible output. Thus, output signals are derived from incident signals, via activation of the switch devices, by reverse or reciprocal action as compared to the transmission of signals. If the incident signal exhibits constant amplitude or signal strength, the output will be a constant DC level across the output load device.

When activation of the switch devices of switch module 30 is in exact synchronization with the received waveform, the output will be a positive DC voltage representing information content of the received signal. With switch activation effective to synthesize a waveform which is a negative replica of the received waveform, the output will be a negative DC voltage representing the information content. Other phasing conditions representing lack of full synchronization will result in reduction in output amplitude and lowered efficiency. For periodic waveforms, an output beat frequency will occur when the switching frequency differs from the incident radiation frequency. The beat frequency will represent the difference in frequencies. Such beat frequency will thus be an indicia of synchronization between activation of the switch devices of switch module 30 and the received signals incident on the loop element 12.

As shown in FIG. 5, a low pass filter 54 may be included to provide discrimination against unwanted signals different in frequency from desired received signals and whose presence could result in a beat frequency at the output. The low pass cutoff frequency of filter 54 will determine the instantaneous band of incident signal frequencies for which the radiation synthesizer will provide reception when in a receive mode. Thus, reception will discriminate against signals prevented by the filter from being coupled to and dissipated in an output or load unit (e.g., speaker 50). For effective information reception, the pass band of the filter must be wide enough to pass the modulation signal bandwidth of desired signals.

In FIG. 5, control device 40 includes a synchronization portion 40a and is responsive to indicia of synchronization of the switch devices of switch module 30 to a characteristic of a received signal. For example, control device synchronization portion 40a may be responsive to the beat signal referred to above, to adjust switch device activation (e.g., switching frequency) to cause the beat frequency to be reduced to a minimum. Synchronization with incoming signals for purposes of signal reception is provided for in many prior types of systems. Many alternatives, including homodyne or synchronous detection, have been described and modern digital signal processing techniques serve to expand available arrangements. While synchronization configurations appropriate for particular implementations of radiation synthesizer systems can be provided by skilled persons, certain aspects will be addressed.

Different synchronization techniques may be appropriate in different implementations. When the incident received radiation is a continuous wave (CW) signal (no modulation) and switch activation is in the correct phase synchronization, the output of the receive radiation synthesizer is a constant voltage of maximum amplitude. The amplitude is proportional to that of the incident signal. When the phase synchronization differs from optimum by 90 degrees the output is zero, and when the phase differs by 180 degrees, the constant output voltage will be maximum, but negative. When the frequency of switch activation is not synchronized with the incident signal there is a "rolling" phase difference between the switch drive and the signal. In other words, the phase difference between the two varies as a linear function of time. Therefore, as time progresses, the output voltage varies throughout its entire range. The output waveform is sinusoidal in shape and the frequency of the sinusoid is equal to the difference frequency. In most cases there will be a difference frequency output from the system upon initiation of reception, since the receiver will typically have no means of determining the exact frequency of the incident waveform in advance. The difference frequency output is an indicia of synchronization that can be used to synchronize the receiver.

In a coordinated system, the incident signal waveform may include specific transmission periods for synchronization. During those periods no modulation would be included on the waveform. A phase-locked-loop may be included in the system to sense the output and use feedback to synchronization portion 40a of the control device to adjust switch device activation frequency to exact synchronization with the incident training waveform. An oscillator designed with sufficient stability and drift characteristics can be arranged to provide a switch activation frequency which would not drift substantially from the optimal synchronization condition between synchronization periods.

If the signal waveform contains a carrier component (e.g., commercial AM radio), and if a radiation synthesizer oscillator is sufficiently stable and accurate, an output difference frequency will exist that is very small. If below several tens of hertz, the error frequency may be filtered from the desired audio modulation and a phase-locked-loop used to drive the error frequency to phase synchronization. An adaptive notch filter may appropriately be used to remove the difference frequency from the output audio.

In the case of FM waveforms, the desired output is a difference frequency that varies with time. The amplitude of the modulation is proportional to the difference frequency. A high-pass or frequency to voltage converter could be used to obtain the desired output modulation. Since both positive and negative frequency deviations will output the same difference frequency, the output of the demodulator will be a full-wave rectified version of the desired output. A circuit that inverts every other period between zero crossings can then be employed to obtain the desired output. In the case where frequency synchronization does not exist, there will be a DC offset after de-rectification. In many cases that is not a problem, but a frequency locked loop can be provided to drive the DC component in the output waveform to zero.

Another arrangement uses quadrature antennas with separate switch modules activated by control signals which differ in phase by 90 degrees. This arrangement is similar to an I-Q (in-phase, quadrature) demodulator. The amplitude of the incident signal can be determined by computing the square root of the sum of the squares of the two output voltages. The phase of the incident signal is found by computing the arc-tangent of the ratio of the two output voltages. This method is presently used in many receivers that require synchronization for demodulation of phase modulated waveforms.

The above are simplified explanations of several possible methods for synchronization, or means to operate in a non-synchronized condition. There are other variations or methods applying known techniques that may use complex signal-processing algorithms. A variety of implementations may be provided by skilled persons, as suitable in different applications.

Operationally, it will be appreciated that a single radiation synthesizer system may be arranged for operation in both receive and transmit modes. Referring to FIG. 5, in the receive mode low pass filter 54 is coupled to the storage capacitance 14 in place of the combination of battery 16 and diode 18, by operation of switch 44. In FIG. 5 control device 40 includes synchronization portion 40a which is operative for receive. For transmit, synchronization is not operative and control device 40 responds to signals at input device 42 which are representative of signals to be transmitted.

Transmit operation is described in greater detail in the '133 and '494 patents. For receive operation the available receive signal power can be represented as a voltage source $V_{RMS}$ in series with the radiation resistance $R_{RAD}$ presented by the antenna element. The value of the voltage source is equal to:

$$V_{RMS} = \sqrt{4 P_{AVAIL} R_{RAD}}$$

Figure 6:
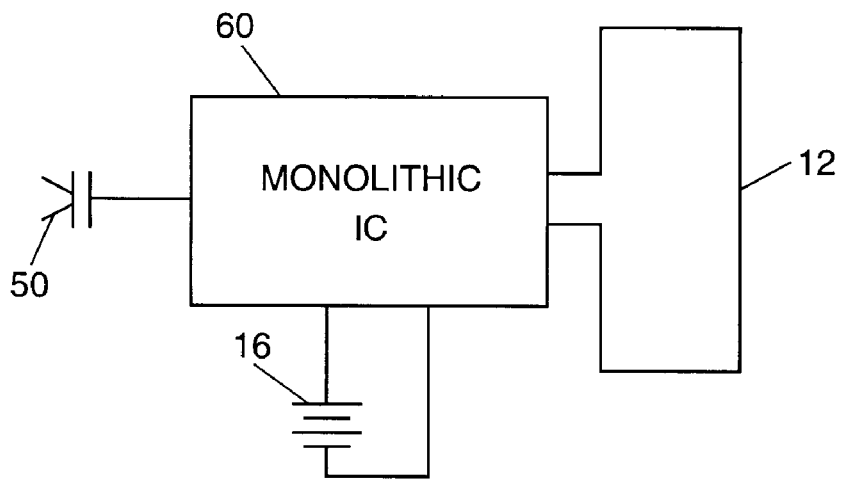
FIG. 6 is a block diagram of a form of simplified radio receiver pursuant to the invention.

An advantage of the receive synthesizer as described is that it inherently incorporates many of the system functions and obviates the need for subsystems which must be separately provided in other types of receivers. Since the output is provided at baseband (e.g., directly usable to feed a loudspeaker or headset), the superheterodyne conversion and RF or IF to baseband detection functions normally included in a conventional receiver system are not required. Thus, in addition to improving efficiency, the radiation synthesizer used to receive signals can provide advantages of greatly simplifying receiver architecture. As represented in FIG. 6, complete monolithic integration of a receiver may be enabled, without requirement for any external filter components. Thus, FIG. 6 represents a block diagram of a complete commercial AM receiver consisting of loop antenna 12, battery 16, speaker 50 and monolithic IC 60, which is designed to provide the remaining circuit portions consistent with the preceding description.

Use of ideal switch devices in the switch module would enable a system employing an electrically-small antenna to operate over a very wide bandwidth with one hundred percent efficiency. Circuit losses associated with actual circuit implementation limit efficiency to a degree, however, the wide band capability is maintained. Thus, efficiencies of systems as described may typically exceed that of traditional type systems by a factor ranging up to 100 or to 20 dB. This enables reduction of the size of a receiving antenna, or improving sensitivity while maintaining antenna size, or a combination of both. In some narrowband applications it may be possible to realize comparable or perhaps superior efficiency by use of traditional tuning techniques. However, even for such narrowband operation, the present invention provides benefits including simplification of receiver architecture and related reliability enhancement. Another benefit is potential avoidance of both closely tolerenced components and the need for tuning adjustments dependent upon the operating environment, which may be requirements of narrowband tuned antennas. More generally, for many newer applications narrowband operation can not meet operating objectives.

The preceding addresses receive modes for radiation synthesizer systems, whereby the synthesizer operation is actively utilized for signal reception. Alternatively, in some applications a radiation synthesizer system configured for transmit operation can be employed for direct signal reception by deactivating synthesizer operation during reception.

Figure 7:
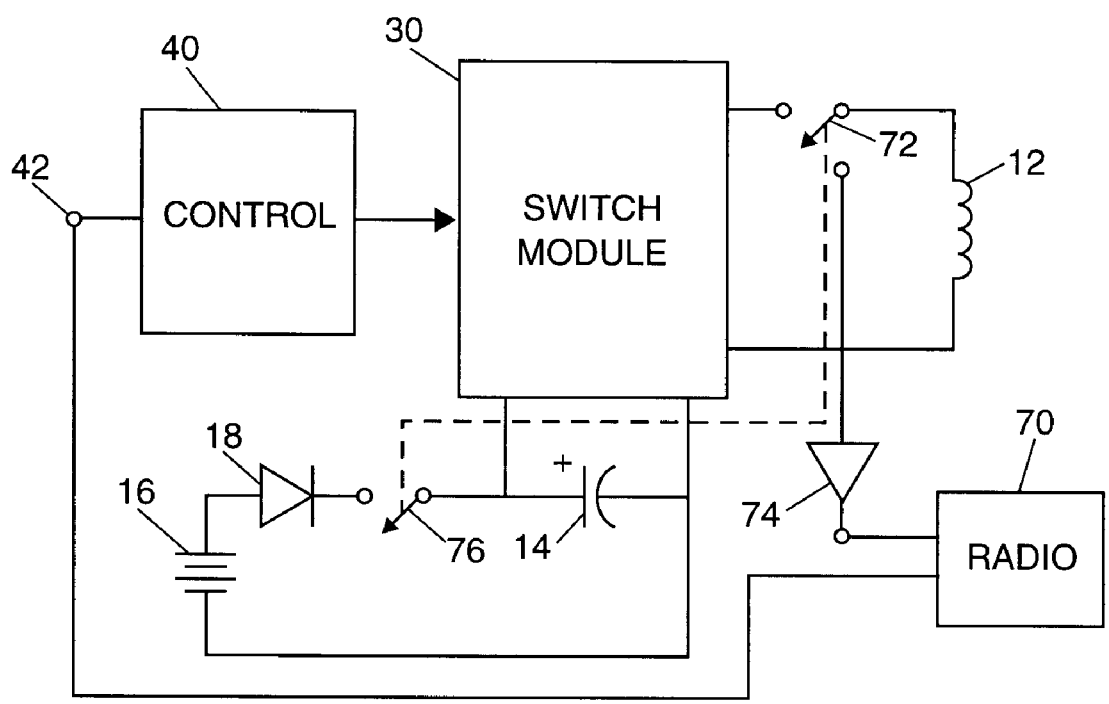
FIG. 7 is a block diagram illustrating aspects of receive mode adaptation of a radiation synthesizer transmit system, to provide signal reception without synthesizer activation.

FIG. 7 illustrates a radiation synthesizer system to receive and transmit signals which corresponds to the FIG. 4 transmit system with certain exceptions. Radio unit 70 may be any suitable device to provide a perceptible output in response to a received RF signal. As illustrated, radio 70 is arranged to be coupled to the loop antenna 12 via switch 72 and low noise amplifier 74. Amplifier 74 may be included or omitted, depending upon the application and effective signal levels. As shown, switch 72 is ganged to switch 76 to disconnect battery 18 when in the receive mode.

Figure 3:
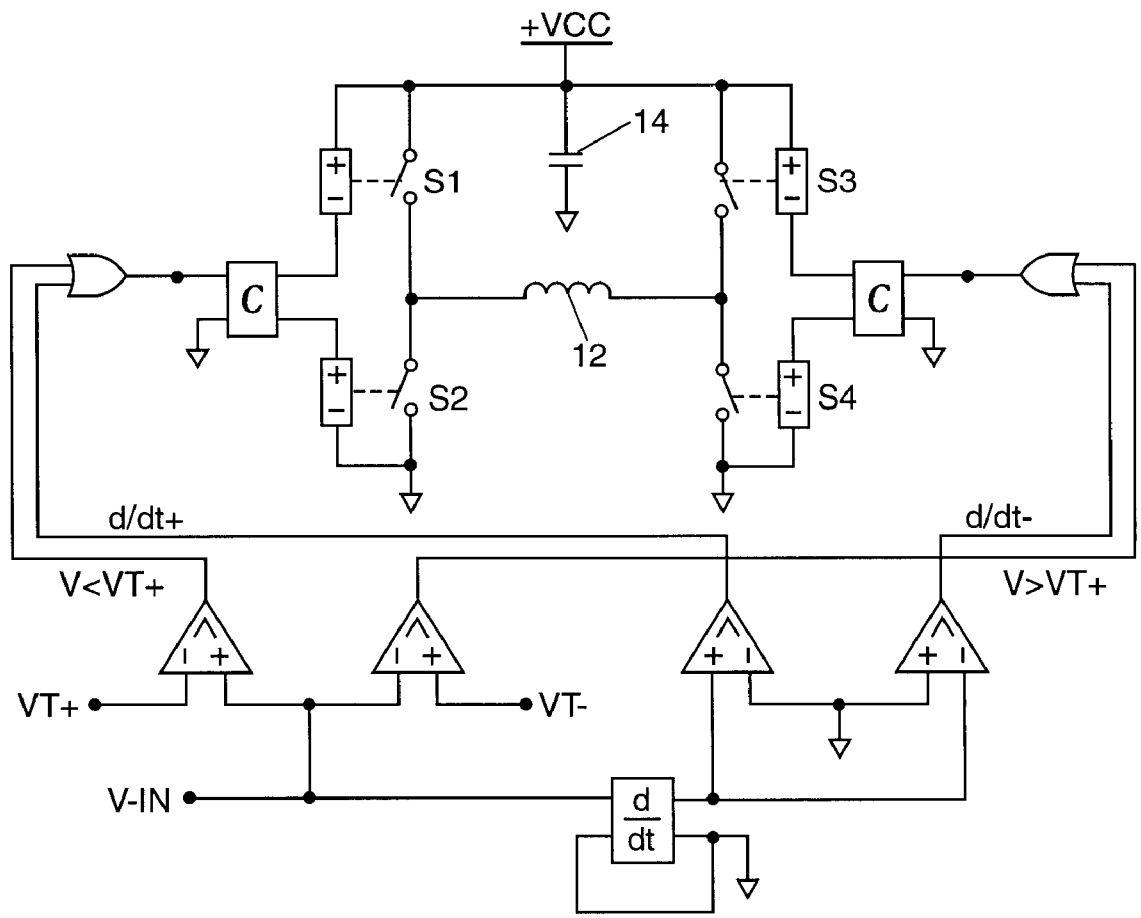
FIG. 3 shows a previously described radiation synthesizer system employing the FIG. 2 circuit.

In addition, with reference to FIG. 3, for use of the loop antenna 12 as a standard loop antenna in the FIG. 7 configuration, in a receive mode switch devices S1 and S2 are held in an open state, while switch devices S3 and S4 are held in a closed state. Radiated signals incident at the loop antenna element 12 can then be accessed by coupling to the loop element 12 directly or via low noise amplifier 74 or other arrangement. The point here is not that signal reception in this manner provides extraordinary results, but that having provided an electrically-small antenna system with extraordinary transmit efficiency, direct signal reception can also be provided. Thus, without synthesizer operation during receive (i.e., no activation of switch devices of a switch module), the antenna operates as a conventional broadband antenna with the poor efficiency that the antennas's small size dictates. In the HF and low VHF bands atmospheric noise predominates over noise produced by the front end of a radio, such as unit 70. It can be acceptable, therefore, to use an inefficient receive antenna while still enabling acceptable operation by appropriate amplification and processing of received signals using established radio techniques. Radio 70 may also be responsive to input signals (e.g., voice signals input via a microphone) to provide to terminal 42 signals representative of signals to be transmitted during transmit mode operation.

Reference is made to pending first application 10/084, 000, titled Radiation Synthesizer Feed Configurations, filed Feb. 26, 2002, and second application 10/114,101, titled Crossed-Loop Radiation Synthesizer Systems, filed contemporaneously herewith, which are hereby incorporated herein by reference. The first such application describes optical control signal coupling and DC supply via multi-conductor antenna construction configurations (see, for example, FIGS. 7 and 8 and related description in such first application). The latter such application describes crossed-loop configurations for body-borne antennas and isotropic coverage (see, for example, FIGS. 4, 5 and 6 and related description in such second application). With inclusion of the disclosures of those applications and of the '133 and '494 patents, skilled persons will be readily enabled to include features disclosed therein in combination with radiation synthesizer systems arranged to receive signals as described herein. Thus, such systems may utilize multisegment loop configurations and crossed or quadrature loop configurations providing additional operational and other advantages, and may utilize control signal feeds via optical cables, DC feeds via conductors comprising the loop antenna, or both.

While there have been described the currently preferred embodiments of the invention, those skilled in the art will recognize that other and further modifications may be made without departing from the invention and it is intended to claim all modifications and variations as fall within the scope of the invention.

What is claimed is:

1. A radiation synthesizer system, to receive incident signals, comprising:

an antenna element having a first reactive characteristic;

a storage element having a second reactive characteristic;

a switch module coupled between the antenna element and the storage element and including switch devices arranged for controlled activation to transfer energy back and forth between the storage element and the antenna element;

an output device coupled to the storage element to enable use of output signals derived, via activation of the switch devices, from signals incident at the antenna element; and a control device coupled to the switch module to control activation of the switch devices, the control device responsive to indicia of synchronization between activation of the switch devices and the signals incident at the antenna element.

2. A radiation synthesizer system as in claim 1, wherein the antenna element is a loop antenna element and the storage element is storage capacitance.

3. A radiation synthesizer system as in claim 1, wherein the output device comprises an output port and the system further comprises:

a transducer unit coupled to the output port to provide a perceptible output.

4. A radiation synthesizer system as in claim 3, wherein said transducer unit is an audio output unit.

5. A radiation synthesizer system as in claim 1, arranged to receive and transmit signals, wherein the control device includes a selectable transmit mode in which the control device is responsive to an input signal representative of a signal to be transmitted and is not responsive to said indicia of synchronization, the system further comprising:

an input device coupled to the control device to enable coupling of said input signal representative of a signal to be transmitted.

6. A radiation synthesizer system as in claim 5, further comprising:

a source of energy for transmission of signals coupled to the storage element when the control device is in said selectable transmit mode.

7. A radiation synthesizer system as in claim 6, wherein said source of energy is a battery.

8. A radiation synthesizer system, to receive incident signals, comprising:

a loop antenna element;

storage capacitance;

at least one switch module coupled between the loop antenna and the storage capacitance and including switch devices arranged for controlled activation to transfer energy back and forth between the storage capacitance and the antenna element;

an output device coupled to the storage capacitance to enable use of output signals derived, via activation of the switch devices, from signals incident at the antenna element; and a control device coupled to the switch module to control activation of the switch devices, the control device responsive to indicia of synchronization between activation of the switch devices and the signals incident at the antenna element.

9. A radiation synthesizer system as in claim 8, wherein the output device comprises an output port and the system further comprises:

a transducer unit coupled to the output port to provide a perceptible output.

10. A radiation synthesizer system as in claim 9, wherein said transducer unit is an audio output unit.

11. A radiation synthesizer system as in claim 8, arranged to receive and transmit signals, wherein the control device includes a selectable transmit mode in which the control device is responsive to an input signal representative of a signal to be transmitted and is not responsive to said indicia of synchronization, the system further comprising:

an input device coupled to the control device to enable coupling of said input signal representative of a signal to be transmitted.

12. A radiation synthesizer system as in claim 11, further comprising:

a source of energy for transmission of signals coupled to the storage element when the control device is in said selectable transmit mode.

13. A radiation synthesizer system as in claim 8, wherein said storage capacitance comprises a plurality of storage capacitance portions.

14. A radiation synthesizer system as in claim 8, wherein: said loop antenna element comprises a plurality of loop segments; said at least one switch module comprises a plurality of switch modules, each coupled between a different pair of said loop segments and to at least a portion of the storage capacitance; and the control device is coupled to each said switch module.

15. A radiation synthesizer system as in claim 14, arranged to receive and transmit signals, wherein the control device includes a selectable transmit mode in which the control device is responsive to an input signal representative of a signal to be transmitted and is not responsive to said indicia of synchronization, the system further comprising:

an input device coupled to the control device to enable coupling of said input signal representative of a signal to be transmitted.

16. A radiation synthesizer system, to receive incident signals, comprising:

a first loop antenna element;

an offset loop antenna element having an operating position offset in azimuth from the first loop antenna;

a storage capacitance;

at least one switch module coupled to a said antenna element, each switch module including switch devices arranged for controlled activation to transfer energy back and forth between the storage capacitance and a loop antenna element;

an output device coupled to the storage capacitance to enable use of output signals derived, via activation of the switch devices, from signals incident at the antenna element; and at least one control device coupled to a switch module to control activation of the switch devices, each control device responsive to indicia of synchronization between activation of those switch devices and the signals incident at the antenna element.

17. A radiation synthesizer system as in claim 16, arranged to receive and transmit signals, wherein each control device includes a selectable transmit mode in which the control device is responsive to an input signal representative of a signal to be transmitted and is not responsive to said indicia of synchronization, the system further comprising:

an input device coupled to a control device to enable coupling of said input signal representative of a signal to be transmitted.

18. A radiation synthesizer system as in claim 17, further comprising:

a source of energy for transmission of signals coupled to the storage element when the control device is in said selectable transmit mode.

19. A radiation synthesizer system as in claim 16, wherein said storage capacitance comprises a plurality of storage capacitance portions.

20. A radiation synthesizer system, to receive and transmit signals, comprising:

an antenna element having a first reactive characteristic;

a storage element having a second reactive characteristic;

a switch module coupled between the antenna element and the storage element and including switch devices arranged for controlled activation to transfer energy back and forth between the storage element and the antenna element;

a control device coupled to the switch module to control activation of the switch devices in response to an input signal representative of a signal to be transmitted; and an output device selectively coupled to the antenna element to enable use of output signals received via the antenna element during receive periods in which said switch devices are not subject to said controlled activation to transfer energy.

21. A radiation synthesizer system as in claim 20, further comprising:

a low noise amplifier coupled between the antenna element and the output device.

22. A radiation synthesizer system as in claim 20, wherein the output device comprises an output port and the system further comprises:

a radio unit coupled to the output port to provide a perceptible output.

* * * * *